Oct. 20, 1964  A. N. MILSTER  3,153,426
ANTI-CREEP BRAKE MECHANISM
Filed July 31, 1961  2 Sheets-Sheet 1

INVENTOR
ARTHUR N. MILSTER
BY Gravely, Lieder &
Woodruff
ATTORNEYS

Oct. 20, 1964     A. N. MILSTER     3,153,426
ANTI-CREEP BRAKE MECHANISM
Filed July 31, 1961     2 Sheets-Sheet 2

INVENTOR
ARTHUR N. MILSTER
BY Gravely, Lieder & Woodruff
ATTORNEYS 3,153,426
ANTI-CREEP BRAKE MECHANISM
Arthur N. Milster, Richmond Heights, Mo., assignor to Wagner Electric Corporation, St. Louis, Mo., a corporation of Delaware
Filed July 31, 1961, Ser. No. 128,068
19 Claims. (Cl. 137—598)

This invention relates to vehicles in general having automatic or semi-automatic transmissions and is more particularly directed to certain new and useful improvements in creep-preventing means associated with an automotive hydraulic braking system.

The primary object of the invention is to provide an electrically operated mechanism for a brake holding device which will permit safe operation thereof under all road conditions.

Another object of the invention is to provide an improved anti-creep mechanism that is activated to an operative condition magnetically with a relatively smaller coil required therefor.

A further object of the invention is to provide a hydraulic brake system which incorporates a check valve interposed between the master cylinder of the system and the brake fluid conduits leading to the brake assemblies on one set of wheels of the vehicle for trapping brake fluid therein, and which is actuated by a switch operatively responsive to a predetermined speed of the vehicle.

Still another object of the invention is to provide a system of the character stated which incorporates a solenoid actuated check valve located in the hydraulic circuit for one set of wheels controlled by a speed responsive pressure switch.

These and still other objects and advantages will become more apparent hereinafter.

In the accompanying drawings wherein like reference characters refer to like parts wherever they occur:

Figure 1:
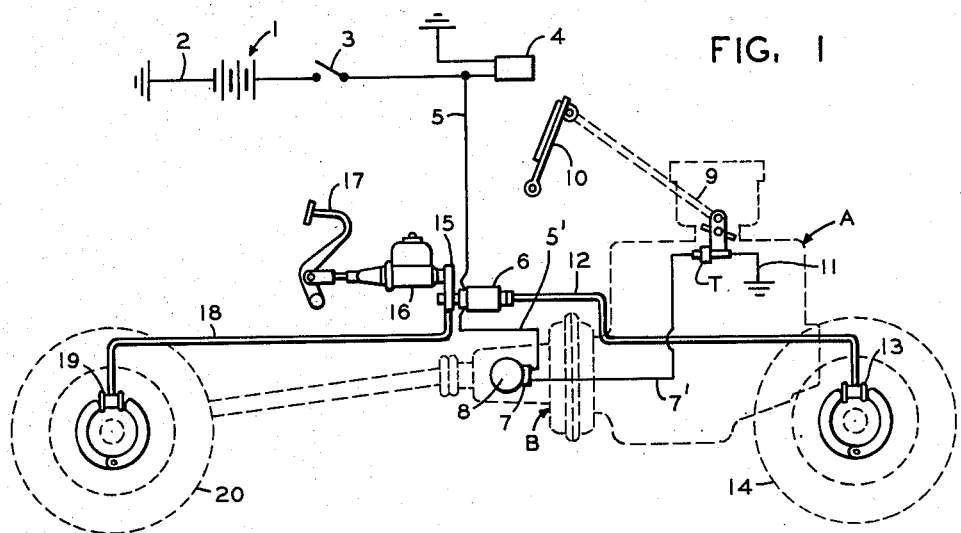
FIG. 1 is a diagrammatic view of the hydraulic braking and electrical systems for a vehicle incorporating creep-preventing means embodying the invention.

Referring to FIG. 1, there is shown the hydraulic braking and electrical systems of a vehicle A having an automatic or semi-automatic transmission designated by the letter B. The numeral 1 indicates a battery having its negative terminal customarily connected to ground by lead 2 and on its positive side connected through an ignition switch 3 to an ignition coil 4. Branching from the line intermediate the ignition coil 4 and the ignition switch 3 is a lead 5 secured to one terminal of the coil of the solenoid actuated check valve or anti-creep mechanism 6, the opposite terminal of the coil being connected by a lead 5' with one terminal of a conventional pressure switch 7 mounted on the pressure pump 8 of the transmission B. The other terminal of the pressure switch 7 is connected by a lead 7' to a throttle switch T of the type fully described in United States Patent No. 2,683,781 dated July 13, 1954, which switch T is connected through suitable linkage 9 to an accelerator foot pedal 10. When the pedal 10 is depressed, the switch T will be open, and upon release of the pedal 10 to inoperative position, the switch T will be shifted into circuit closing position. The opposite side of the throttle switch T is connected by lead 11 to ground to complete the electrical circuit for the check valve coil.

Extending from the outlet end of the check valve 6 is a conduit 12 for passage of brake fluid to the fluid motors 13 of the brake assemblies of the forward wheels 14. The inlet end of the valve 6 is connected to a suitable tube fitting 15 through which brake fluid passes to valve 6 from a master brake cylinder 16 actuated by a foot pedal 17. Also connected to the master cylinder 16 by the fitting 15 is a rearwardly extending conduit 18 which communicates with the fluid motors 19 of the rear wheels 20.

Figure 2:
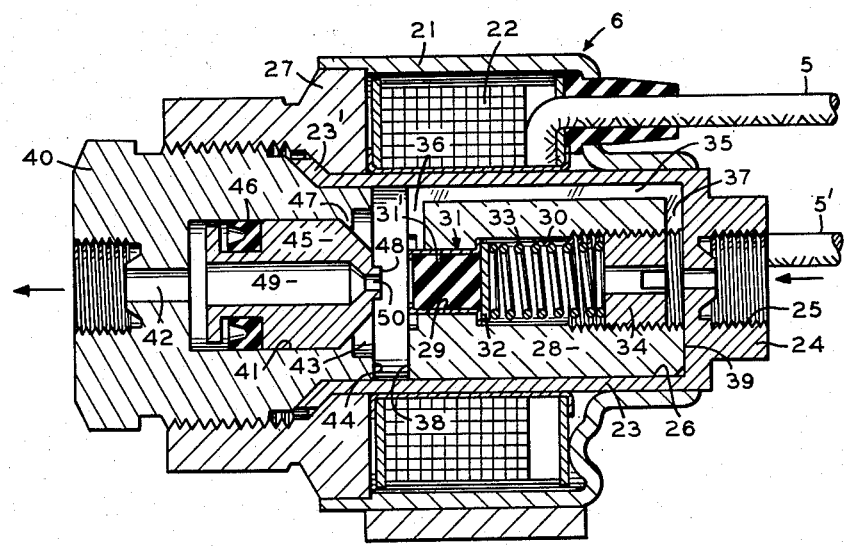
FIG. 2 is an enlarged longitudinal sectional view of the creep-preventing check valve in its inoperative position.
Figure 3:
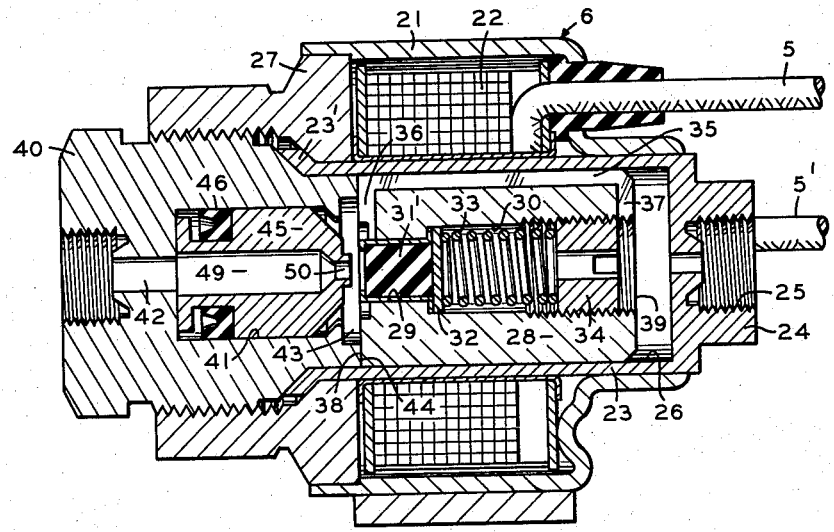
FIG. 3 is an enlarged longitudinal sectional view of the check valve shown in an operative position.

Referring now to FIGS. 2 and 3, it will be noted that the check valve 6 comprises a casing 21 having a solenoid coil 22 disposed therein, the terminals of which are connected to leads 5, 5' as described hereinabove. Extending through the casing 21 and the bore of coil 22 is a nonmagnetic guide member 23 having a rearwardly projecting end portion 24 which is axially bored and tapped, as at 25, for engagement with the fittings 15 to provide the inlet passage. This guide member 23 is counterbored, as at 26, and flared at its forward end 23' for snug, surfacewise engagement on its outer face against the interior face of a casing member 27 for enclosing the coil 22 within the forward end of the casing 21. An armature 28 is received within the counterbore 26 of guide member 23 for sliding movement therein, the armature or plunger 28 being bored and counterbored in axial alignment with inlet connection 25 of the guide member 23 to provide a forward opening 29 and an enlarged rearward opening 30. A valve assembly 31 including a resilient valve 31' is slidable in the opening 29 and is carried by a supporting member 32 disposed within the counterbore 30, the rightward end of said supporting member 32 providing a bearing surface for one end of a valve spring 33 which urges valve assembly 31 forwardly. The other end of valve spring 33 bears against an adjustable plug 34 threadedly engaged within the section 30 for loading the spring 33.

The armature or plunger 28 is preferably hexagonal in cross-section to provide spaced line contacts for minimal frictional sliding engagement with the counterbore 26, and to form longitudinal passages 35 between the plunger and counterbore thereby accommodating free fluid flow therethrough. Radial recesses or the like 36 and 37 are formed in the front and rear ends 38 and 39, respectively, of the plunger 28, the recesses being in fluid communication with the longitudinal passages 35 and the axial end portions of the plunger to assure fluid flow between the inlet 25 and the front face 38 circumscribing the valve assembly 31, at all times.

A valve stop or abutment member 40 is secured within the flared end portion 23' of the guide member 23 and the coil enclosing casing member 27, and is adapted to be magnetically energized by the coil 22 for attracting the plunger 28, as will appear. The abutment member 40 has a bore 41 and an axial outlet port 42 forming an outlet connection with the conduit 12 to the front wheel cylinder 13. The abutment member 40 also has an enlarged central recess 43 in its face 44 opposing the front face 38 of the plunger 28, and it will be noted that the valve assembly 31 does not project beyond the front face 38 and will not be seated against the fixed abutment 40 to perform a sealing function.

A piston or control element 45 having a seal 46 is slidably positioned in the bore 41 of the abutment member 40, the element 45 being retained in the bore 41 by staking 47 or the like. The control element 45 has a central projection 48 forming a valve seat opposite to the resilient valve 31' of the plunger 28 and the element has a flow passage or bore 49 with a restricted portion or orifice 50 therein extending through the valve seat 48.

In operation of the control or check valve 6, pressure fluid is displaced by the master cylinder 16, due to operator actuation of the foot pedal 17, to the rear wheel cylinders 18 and through the inlet connection 25 of the check valve 6. Fluid will pass through the passages 35, 36 and 37 around the plunger 28 and through the restricted passage 49 to the outlet 42 to the front wheel cylinders 13. It is apparent that the displacement pressure fluid flow passing through the passage 49 is throttled or restricted by the orifice 50 to establish a pressure differential or drop across the piston 45, and since the opposed effective end areas of said piston are substantially equal, the established pressure differential acts on said end areas to move said piston leftwardly in the bore 41 to the position shown in FIG. 3.

When the vehicle has reached the speed at which the pump pressure is reduced to close the pressure switch 7, the electrical circuit will be completed to energize the coil 22 due to the fact that the throttle switch T is closed when the accelerator 10 is released to apply the brake pedal 17. Energization of the solenoid coil 22 produces a magnetic attraction by the abutment member 40 for moving the plunger 28 leftwardly against the member 40, FIG. 3. It will be seen in FIG. 3 that movement of the plunger 28 to its operative position does not effect closing of communication to the front wheel cylinders 13 whereby the solenoid coil 22 may be energized by any type of switch responsive to deceleration of the vehicle. However, it is preferred to use the speed responsive switch 7, which will generally be closed when the vehicle speed is about 5 m.p.h. and below, so that the braking effort will be substantially completed. Inasmuch as the plunger 28 is freely movable in the bore 26 and is not energized against spring forces, the coil 22 is relatively small since only a relatively low E.M.F. is required to move the plunger against its abutment.

At the end of a braking application when the vehicle is stopped and the foot pedal 17 is released to deenergize the master cylinder 16, the pressure fluid on the outlet side of the check valve 6 will tend to return to the master cylinder 16 through the restricted passage 49 of the piston 45. It is apparent that the return pressure fluid flow passing through the passage 49 is also throttled or restricted by the orifice 50 to establish a pressure differential in the opposite sense to that established by the displacement flow passing through said passage and orifice; therefore, the pressure differential so established in the opposite sense by the return flow also acts on the substantially equal opposed end areas of the piston 45 to move said piston rightwardly in the bore 41 and sealably engage the valve seat 48 with the valve 31' of the plunger 28. In this manner, the passage 49 is closed preventing the subsequent passage of the return flow therethrough, and fluid pressure is trapped on the outlet side of the anti-creep mechanism 6. If the force of the trapped fluid pressure acting on the effective area of the valve seat element 45 is greater than the compressive force of the spring 33, said element is moved further rightwardly into engagement with the abutment 47 against the compressive force of the spring 33. It is apparent that compression of the valve spring 33 is effected solely by the action of the trapped fluid pressure rather than by the magnetic attraction between the plunger 28 and abutment member 40. Further, if the force of the trapped fluid acting through the passage 49 on the effective area of the valve 31' is greater than the compressive force of the spring 33, the valve assembly 31 is unseated from the seat 48 of the element 45 to bleed down trapped fluid until the forces are equalized whereupon the valve 31' is again seated on the element to maintain fluid pressure no greater than or predetermined maximum amount trapped in the front wheel cylinders 13 to prevent forward movement of the vehicle A.

When the vehicle is accelerated, the coils 22 are deenergized and the force of the remaining trapped fluid pressure return the plunger 28 and element 45 to their original positions thereby allowing return flow of the pressure fluid from the outlet side of the anti-creep mechanism 6 to the inlet side thereof.

Figure 4:
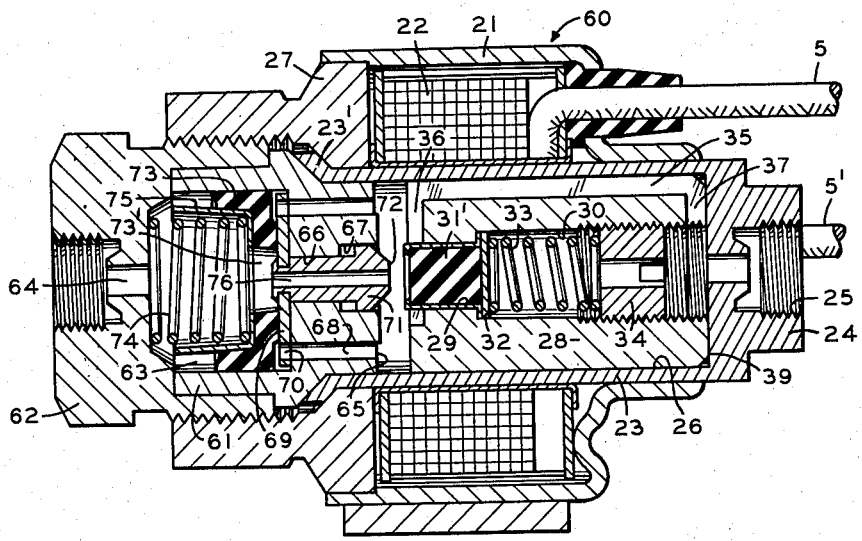
FIG. 4 is an enlarged longitudinal sectional view of a modified check valve construction.

Referring now to FIG. 4 wherein a modified check or control valve 60 is identified with like numerals to the parts of preferred valve 6 in FIG. 2, except in respect of the piston and abutment members forming the left-hand portions of FIG. 4.

A valve stop or abutment member 61 is secured within the flared end 23' of the guide member 23 by a casing end plug 62 threaded in the coil casing 27, the member 61 and end plug 62 being spaced to provide an internal chamber 63. The end plug 62 has a port 64 forming an outlet connection with conduit 12 to the front wheel cylinders 13. The abutment member 61 has a face 65 opposite to the plunger 28 for engagement thereby, and an axial bore 66 and counterbore 67 are formed through the abutment member 61. A plurality of ports 68 are also formed through the member 61 radially outwardly of the bore and counterbore 66 and 67, and a rigid disc or flange 69 is position in the chamber 63 and has openings 70 aligned with the ports 68. The disc 69 carries a valve seat element 71 slidably positioned the bore and counterbore 66 and 67 of the abutment member 61, and having a seating surface 72 projecting toward the valve 31'. An annular sealing cup 73 having a central opening 73' is positioned in the chamber 63 and is biased by a spring 74 acting against a retainer 75 to normally maintain the disc 69 against the abutment member 61 and project the valve seat element 71 rightwardly toward the valve 31. It will be noted that the seal 73 seals against the disc 69 inwardly of the openings 70 therein and against the chamber wall outwardly of the openings 70. However, normal fluid communication is provided to the wheel cylinders 13 through a restricted axial passage 76 in the valve seat element 71 and through the ports 68 and openings 70 by reason of collapse of the sealing cup lip and displacement of the sealing cup 73 from the disc 69 against the biasing action of the spring 74 due to the fluid pressures exerted thereon.

In operation of the embodiment of the anti-creep mechanism 60 shown in FIG. 4, a braking application is initiated as previously described. Pressure fluid is displaced from the master cylinder 16 past the plunger 28 and through the restricted passage 76 of the element 71 to the outlet 64 and through the ports 68 and openings 70 between the sealing cup 73 and disc 69. The displacement flow creates a fluid pressure which acts on the effective area of the sealing cup 73 to move the sealing cup leftwardly against the compressive force of spring 74 and effect the fluid passage between the cup and disc 69, and it should be noted that the displacement flow through the restricted passage 76 also creates a pressure differential across the elements 71 which serves to move said element leftwardly into abutting engagement with the abutment shoulder formed between the bore 66 and counterbore 67.

When a predetermined rate of deceleration is attained, the coil 22 is energized to move the plunger 28 leftwardly into magnetic engagement with abutment member 61, and since this magnetic engagement is not opposed by spring forces, it is apparent that the E.M.F. required to effect this magnetic engagement is relatively low and that a smaller size coil 22 is required to effect this magnetic engagement.

When the braking application is ended, return flow of pressure fluid through the restricted passage 76 also creates a pressure differential across the elements 71 in an opposite sense to that created by the displacement flow so that said element is moved rightwardly to sealably engage the valve seat 32 with the valve 31' closing the restricted passage 76 and subsequently preventing passage of the return flow therethrough. Meanwhile, the trapped fluid pressure on the outlet side of the anti-creep mechanism 60 acts on the effective area of the sealing cut 73 to re-engage the cup and disc 69 and subsequently prevent passage of the return flow through the ports 68 and openings 70. If the trapped fluid pressure acting on the effective area of the sealing cup 73, disc 79, element 71 and on the valve 31' through the passage 76 creates a force greater than the compressive force of the spring 33, said sealing cup, disc, element and valve are concertly moved rightwardly against the compressive force of the valve spring 33 until said disc is re-engaged with the abutment member 61. Further, if the trapped fluid pressure acting on the effective area of the valve 31' through the passage 76 is above a predetermined amount to create a force greater than that of the spring 33, the valve 31' will be unseated and the fluid pressure will bleed down until the forces are equalized whereupon the valve 31' will again be seated on seat 72 of the element 71 to maintain a fluid pressure no greater than a predetermined maximum amount in the front wheel cylinders 13.

When the vehicle A is accelerated, the coils 22 are de-energized and the force of the trapped fluid pressure will return the valve assembly and plunger 28 to their inoperative positions, FIG. 4, allowing the return of pressure fluid to the inlet side of the mechanism 60.

It will now be apparent that the operation of the present anti-creep mechanisms 6, 60 is positive acting and permits the use of relatively smaller coils 22 since magnetic attraction between the plunger 28 and abutment members 40, 61 is not opposed by spring forces. When the magnetic engagement is completed, a greater force is necessary to separate these parts than was required to produce engagement thereof.

This invention is intended to cover all modifications of the disclosed embodiments that will be readily apparent to all skilled in the art, and the invention is limited only by the claims which follow.

What I claim is:

1. A pressure fluid control valve comprising a pair of opposed movable valve members controlling displacement and return pressure fluid flow through said control valve, passage means in one of said valve members through which the displacement and return flow passes, and electroresponsive means for moving the other of said valve members to an operative position relative to operative position of said one valve member, said one valve member being movable to an inoperative position in response to the displacement flow to provide passage therefor through said passage means and movable to an operative position into sealing engagement with said other valve member in response to the return flow to close said passage means and subsequently prevent passage therefor through said passage means.

2. The pressure fluid control valve according to claim 1 comprising orifice means in said passage means responsive to displacement and return flow therethrough to establish pressure differentials in opposite senses across said one valve member, said one valve member being movable to the inoperative position in response to the established pressure differential in one sense and the operative position in response to the established pressure differential in the opposite sense.

3. A pressure fluid control valve comprising a housing having a passage therethrough, abutment means in said passage, a pair of movable valve members slidable in said passage on opposite sides of said abutment means, said valve members controlling displacement and return pressure fluid flow through said passage, passage means in one of said valve members through which the displacement flow passes in one direction and the return flow passes in the opposite direction, and electro-responsive means for magnetically energizing said other valve member into engagement with said abutment means, said one valve member being movable away from said abutment means to an inoperative position in response to the displacement flow to provide passage therefor through said passage means in the one direction and movable to an operative position toward said abutment means and into sealing engagement with said other valve member in response to the return flow to close said passage means and subsequently prevent passage therefor through said passage means in the opposite direction.

4. The control valve according to claim 3 wherein said other valve member includes seal means, and a valve seat on said one valve member about said passage means adapted for sealing engagement with said seal means to close said passage means, said valve seat being moved into sealing engagement with said seal means to close said passage means upon the movement of said one valve member to the operative position thereof.

5. The control valve according to claim 3 wherein said other valve member includes yieldable means for sealing engagement with said one valve member to close said passage means upon movement of said one member to the operative position thereof, said one valve member being further movable against said yieldable means subsequent to the sealing engagement therebetween into engagement with said abutment means and said yieldable means being thereafter further yieldable to a position disengaged from said one valve member providing a limited return flow of displaced pressure fluid through said passage means when the fluid pressure of the displaced pressure fluid acting on said one valve member and yieldable means exceeds a predetermined magnitude.

6. The control valve according to claim 3 wherein said other valve member includes a sealing element movable therein for sealing engagement with said one valve member to close said passage means upon movement of said one member to the operative position thereof, and resilient means in said other valve member urging said sealing element toward sealing engagement with said one valve member, said one valve member and sealing element being concertly movable subsequent to the sealing engagement therebetween against said resilient means until said one valve member engages said abutment means and said sealing element being thereafter independently movable against said resilient means to a position disengaged from said one valve member providing limited return flow of displaced pressure fluid when the fluid pressure thereof acting on said one valve member and sealing element exceeds a predetermined magnitude.

7. A pressure fluid control valve comprising a housing having inlet and outlet ports, a passage interconnecting said ports, abutment means in said passage between said ports, a first valve member slidable in said passage between said outlet port and abutment means, a second valve member slidable in said passage between said inlet port and abutment means and adapted for sealing engagement with said first valve member, said first and second valve member controlling displacement and return flow of pressure fluid through said flow passage from said inlet port to said outlet port and from said outlet port to said inlet port, respectively, passage means in said first valve member normally in open pressure fluid communication with said passage and through which the displacement and return flow passes, electro-responsive means for magnetically energizing said second valve member into magnetic holding engagement with said abutment means, said first valve member being movable away from said abutment means and second valve member in response to the displacement flow to provide passage of the displacement flow through said passage means and movable toward said abutment means and into sealing engagement with said second valve member in response to the return flow to close said passage means and subsequently prevent passage of the return flow therethrough.

8. A pressure fluid control valve comprising a housing having passage means therein for the passage of displacement and return pressure fluid flow through said control valve, piston means slidable in said passage means, magnetically energized valve means slidable in said passage means relative to said piston means, electro-responsive means for magnetically energizing said valve means to an operative position in said passage means, and a flow restricting passage in said piston means through which the displacement and return flow passes in opposite directions, said flow restricting passage establishing pressure differentials in opposite senses across said piston means upon displacement and return flow therethrough, respectively, and said piston means being movable away from said valve means in response to the pressure differential established in one sense to provide passage of the displacement flow through said flow restricting passage and movable in response to the pressure differential established in the opposite sense into sealing engagement with said valve means to close said flow restricting passage and prevent passage of the return flow therethrough.

9. A pressure fluid control valve comprising a housing having inlet and outlet chambers therein for the passage of displacement and return flow through said control valve, piston means slidable in the outlet chamber between operative and inoperative positions, a flow passage in said piston means through which the displacement and return flow passes in one direction from the inlet chamber to the outlet chamber and in an opposite direction from the outlet chamber to the inlet chamber, magnetically energized valve means slidable in the inlet chamber between operative and inoperative positions, electro-responsive means for magnetically energizing said valve means to its operative position, and flow throttling means in said flow passage for establishing pressure differentials in opposite senses across said piston means upon displacement and return flow through said flow passage, respectively, said piston means being movable to its inoperative position in response to the pressure differential established in one sense to provide passage of the displacement flow in the one direction through said flow passage and movable in response to the pressure differential established in the opposite sense to its operative position and into sealing engagement with said valve means to close said flow passage and subsequently prevent passage of the return flow through said flow passage in the opposite direction.

10. A pressure fluid control valve comprising a housing having bore and counterbore therein, abutment means between said bore and counterbore, inlet and outlet ports connected in pressure fluid communication with said counterbore and bore, respectively, piston means slidable in said bore between said outlet port and abutment means, a flow passage in said piston means normally in open pressure fluid communication with said inlet and outlet ports and through which displacement and return pressure fluid flow passes from said inlet port to said outlet port and from said outlet port to said inlet port, respectively, magnetically energized valve means slidable in said counterbore between said inlet port and abutment means and adapted for sealing engagement with said piston means, electro-responsive means for magnetically energizing said valve means into engagement with said abutment means, and orifice means in said flow passage for establishing pressure differentials in opposite senses across said piston means upon displacement and return flow through said flow passage, respectively, said piston means being movable away from said abutment means and valve means in response to the pressure differential established in one sense to provide passage of the displacement flow through said flow passage and movable in response to the pressure differential established in the opposite sense toward said abutment means into sealing engagement with said valve means to close said flow passage and subsequently prevent passage of the return flow therethrough.

11. A pressure fluid control valve comprising a housing having passage means therein for the passage of displacement and return pressure fluid flow through said control valve, abutment means in said passage means, piston means slidable in said passage means on one side of said abutment means, magnetically energized valve means slidable in said passage means on the other side of said abutment means, a flow passage in said piston means normally in open pressure fluid communication with said passage means and through which the displacement and return flow passes, a valve seat on said piston means in circumscribing relation with said flow passage, electro-responsive means for magnetically energizing said valve means into magnetic holding engagement with said abutment means and adapted for sealing engagement with said valve seat, and orifice means in said flow passage for establishing a pressure differential in one sense across said piston means upon displacement flow through said flow passage and for establishing another pressure differential in an opposite sense across said piston means upon return flow through said flow passage, said piston means being movable away from said abutment means and valve means in response to the pressure differential established in the one sense to maintain said flow passage in open pressure fluid communication with said passage means and provide passage of the displacement flow through said flow passage and movable in response to the other pressure differential established in the opposite sense toward said abutment means to sealably engage said valve seat with said valve member thereby closing said flow passage and subsequently preventing passage of the return flow therethrough.

12. Control valve means for pressure fluid comprising a pair of valve control members adapted for relative movement between inoperative and operative positions to control displacement and return pressure fluid flow through said control valve means, pasage means in one of said valve control members through which the displacement and return flow passes, electro-responsive means for moving the other of said valve control members from the inoperative position to the operative position thereof, said one valve control member being movable to the inoperative position thereof in response to the displacement flow through said passage means, seal means in said other valve control member and facing said one valve control member, and a valve seat on said one valve control member in circumscribing relation with said passage means and facing said other valve control member for sealing engagement with said seal means when said other valve control member is in the operative position thereof, said one valve control member being movable to the operative position thereof in response to the return flow to sealably engage said valve seat with said seal means when said other valve control member is in its operative position and close said passage means interrupting passage of the return flow therethrough.

13. A pressure fluid control valve comprising a pair of members movable between operative and inoperative positions in said control valve for controlling displacement and return pressure fluid flow therethrough, passage means in one of said members through which the displacement and return flow passes, electro-responsive means responsive to a preselected condition for moving the other of said members from the inoperative position to the operative position thereof, and yieldable valve means in said other member for engagement with said one member to close said passage means when said valve members are in their operative positions, said one valve member being movable in response to the displacement flow toward the inoperative position thereof in a direction disengaged from said valve means to provide passage for the displacement flow through said passage means and movable in response to the return flow toward the operative position thereof into sealing engagement with said valve means when said other member is in its operative position to close said passage means and interrupt passage of the return flow therethrough, and said valve means being yieldable to disengage said one member and provide passage through said passage means of a limited return flow of displaced pressure fluid when the fluid pressure thereof exceeds a predetermined magnitude.

14. A pressure fluid control valve comprising a pair of relatively movable members controlling displacement and return pressure fluid flow through said control valve, passage means in one of said members through which the displacement and return flow passes, electro-responsive means for moving the other of said members to an operative position in said control valve, a sealing element movable in said other member and adapted for sealing engagement with said one member about said passage means, said one member being movable away from said sealing element in response to the displacement flow to provide passage therefor through said passage means and movable into sealing engagement with said sealing element when said other member is in its operative position in response to the return flow to close said passage means and interrupt passage therefor through said passage means, and resilient means normally urging said sealing element toward engagement with said one member, said resilient means being yieldable to permit disengagement of said sealing element from said one member and provided a limited return flow through said passage means when the fluid pressure of the displaced pressure fluid acting on said sealing element exceeds a predetermined magnitude.

15. A pressure fluid control valve comprising a housing, means within said housing defining a passage through said control valve including abutment means therein, a pair of members movable in said passage on opposite sides of said abutment means for controlling pressure fluid flow in one direction and a direction opposite to said one direction through said passage, passage means in one of said members through which pressure fluid flow passes in the one and opposite directions, a valve seat on said one member in circumscribing relation with said passage means, electro-responsive means for energizing the other of said members into magnetic holding engagement with said abutment means, said one member being movable away from said abutment means and said other member in response to pressure fluid flow in the one direction to provide passage therefor through said passage means, a sealing element movable in said other member and adapted for sealing engagement with said valve seat, said one member being movable in response to pressure fluid flow in the other direction toward said abutment means to engage said valve seat with said sealing element and close said passage means interrupting passage therethrough of presure fluid flow in the other direction, and resilient means normally urging said sealing element toward engagement with said valve seat, said one member and sealing element being concertly movable subsequent to the engagement of said valve seat and sealing element against said resilient means to engage said one member with said abutment means and said sealing element being thereafter movable independently of said one member against said resilient means to a position disengaged from said valve seat providing limited pressure fluid flow through said passage means in the opposite direction when the fluid pressure of the pressure fluid flow in the opposite direction acting on said one member and sealing element exceeds a predetermined magnitude.

16. Control valve means for fluid pressure comprising a housing, a pair of interconnected chambers in said housing including abutment means therebetween through which displacement and return pressure fluid flow is passed, a pair of valve control members movable in said chambers and adapted for engagement with said abutment means, respectively, electro-responsive means for moving one of said valve control members in one of said chambers into magnetic holding engagement with said abutment means, passage means in the other of said valve control members through which the displacement and return flow passes, said other valve control member being movable in the other of said chambers to a position disengaged from said abutment means in response to the passage of displacement flow through said passage means, and other means in said one valve control member for sealing engagement with said other valve control member to close said passage means, said other valve control member being movable in response to the passage of return flow through said passage means toward said abutment means and into sealing engagement with said other means to close said passage means and interrupt the passage of return flow therethrough when said one valve control member is positioned in magnetic holding engagement with said abutment means.

17. The control valve means according to claim 16 wherein said other means includes a sealing member yieldably mounted in said one valve control member, said sealing member being initially yieldable to permit further movement of said other valve control members into engagement with said abutment means in response to fluid pressure of the displaced pressure fluid in excess of a predetermined magnitude acting thereon and said sealing member being thereafter yieldable to a position disengaged from said other valve control member and providing the passage of a limited return flow of displaced pressure fluid until the fluid pressure thereof is reduced to the predetermined value.

18. An anti-creep device comprising a housing, first and second cooperable valve means for accommodating displacement and return pressure fluid flow through said device and each valve means being movable in said housing between operative sealing positions and inoperative pressure fluid passing positions, electro-responsive means for moving one of said valve means from its inoperative position to its operative position relative to the operative position of the other of said valve means, and said other valve means being responsive to the displacement flow for movement to its inoperative position and responsive to the return flow of displaced pressure fluid for movement to its operative position into sealing engagement with said one valve means to interrupt said return flow.

19. A creep-prevent device comprising casing means having an inlet and an outlet therein to accommodate displacement and return pressure fluid flow through said device, a stop element fixed to said casing adjacent to said outlet and having a bore, valve means slidable in said bore, means within said casing including said valve means providing restricted passage means in pressure fluid flow communication with said inlet and outlet ports through which said displacement and return flow passes, a plunger movable in said casing into abutment with said stop element and having a spring loaded resilient valve seat opposed to said valve means, and electrical means responsive to predetermined selected conditions to move said plunger into abutment with said stop element, said valve means being movable in response to the return flow of displaced pressure fluid into sealed engagement with said resilient valve seat to interrupt the return flow and prevent the return of the entire amount of displaced pressure fluid.

References Cited in the file of this patent
UNITED STATES PATENTS

| | | |
|---|---|---|
| 2,424,331 | Rose | July 22, 1947 |
| 2,472,544 | Nissen | June 7, 1949 |
| 2,837,186 | Price | June 3, 1958 |
| 2,869,581 | Perez | Jan. 20, 1959 |